UNITED STATES PATENT OFFICE.

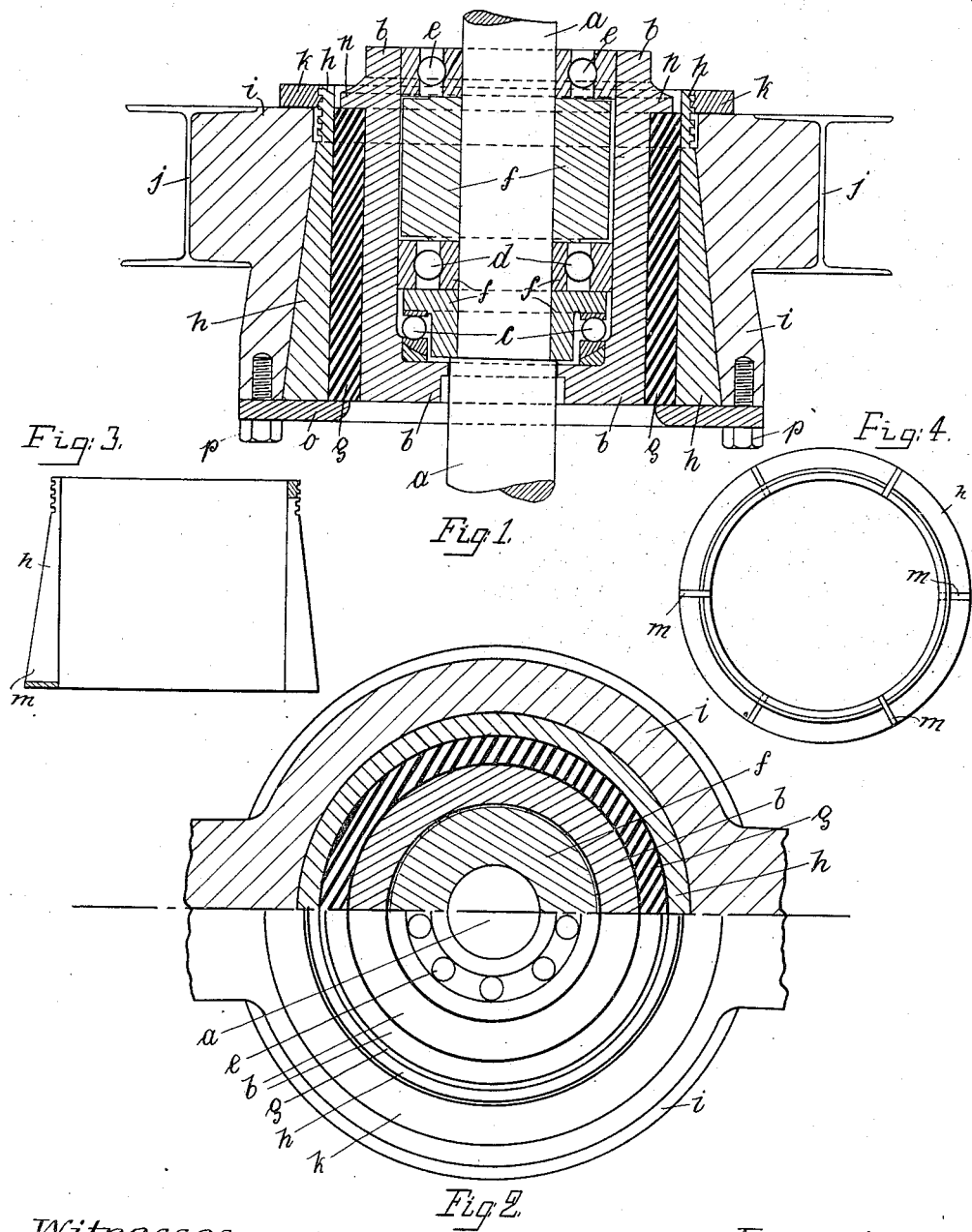

WILLIAM JOHN GEE, OF LONDON, ENGLAND.

BEARING FOR CENTRIFUGAL MACHINES.

1,060,246. Specification of Letters Patent. Patented Apr. 29, 1913.

Application filed August 7, 1912. Serial No. 713,797.

*To all whom it may concern:*

Be it known that I, WILLIAM JOHN GEE, engineer, a subject of the King of England, residing at 48 Kingsmead road, Tulse Hill, London, England, have invented new and useful Improvements in Bearings for Centrifugal Machines, of which the following is a specification.

This invention relates to improvements in flexible bearings such as are used for controlling the oscillations of the spindles of suspended centrifugal machines and the like. It is well known that such machines which are required to rotate at relatively high speeds develop oscillating or precessional movements which require to be controlled or damped down in order to prevent the vibration thereby set up from becoming destructive or inconvenient. For this purpose it has been the practice to use elastic buffers of rubber or similar material applied in various ways.

According to one known method of supporting the spindle a single rubber buffer is used which carries the weight of the spindle and the load and at the same time controls the gyratory movement of the spindle. This buffer consists substantially of a conical rubber sleeve surrounding a corresponding conical portion of the spindle or housing of the bearing of the spindle. The conical buffer rests upon a corresponding conical bearing surface and is compressed by the weight of the spindle and the load carried by the spindle.

According to the present invention a single rubber buffer is used, but the compression of the material of the buffer which is required in order to obtain an effective control of the gyratory movement of the spindle is obtained substantially by radial compression of the sleeve by means of an independent compression device. The sleeve has a prismatic or a cylindrical inner surface and supports the spindle or housing of the spindle bearing partly by frictional contact and partly in a direct manner. Owing to the prismatic or cylindrical inner surface of the sleeve no wedging action is exerted by the spindle or housing upon the buffer and the compression in the radial direction is practically entirely due to the independent external compression device. The compression of the sleeve or buffer may therefore be adjusted not only in accordance with the load but also in accordance with other factors which in certain circumstances may be even more important than the load, for instance the distribution or the degree of uniformity of distribution of the load, the speed of rotation and so on.

According to the simplest manner of carrying the invention into practice a cylindrical sleeve or buffer of rubber or the like is provided inclosing or surrounding the housing of the bearing. The sleeve is supported at its lower end by a flange on the framework supporting the bearing, the flange projecting inwardly under the sleeve. Suitable clearance is left on the inner edge of the said flange to allow for maximum oscillation.

The housing of the bearing is supported at its upper end by a flange projecting outwardly over the upper end of the rubber sleeve. A suitable clearance is left on the outer edge of the flange on the housing to allow for the maximum oscillation. Means are preferably provided for compressing the rubber sleeve equally over the whole of its controlling surface so as to permit the adjustment of its resiliency as well as facilitate the assembling of the parts and taking up wear. For this purpose a sleeve of split steel, or the like, is provided which has an internal surface corresponding to the external surface of the cylindrical rubber sleeve, but on the outside tapers inward toward the top. This tapering sleeve is inclosed in a casing attached to the framework supporting the bearing, so that it can be raised in the casing by means of a screw nut at the top of the casing or in other suitable manner. The divided parts of the tapered sleeve allow the rubber buffer to be equally compressed as aforesaid without at any time interfering with the perfectly cylindrical shape of the internal surface of the rubber sleeve.

The spindle may rotate in radial and thrust ball or other bearings mounted in the housing of the bearing and supported by a flange projecting inwardly at its lower end.

In the accompanying drawings is shown a construction of the improved buffer by way of example.

Figure 1 shows in sectional elevation the complete bearing. Fig. 2 is a plan partly in section of the same. Figs. 3 and 4 show in vertical section and plan a detail view of the conical split ring for compressing the buffer sleeve.

*a* represents the vertical spindle or shaft which may be carried in the usual manner by a ball bearing arranged within the casing or housing *b*. The ball bearings shown in the drawing sustain the weight of the spindle and the machine and also take the side pressure during oscillation. The lowest row of balls *c* serves as a thrust bearing while the upper rows *d* and *e* form the running bearing and keep the spindle in position within the housing *b*. The parts *f* rotate with the spindle. The above described manner of mounting the spindle in the housing does not form part of the present invention and is well known.

The improved buffer forming the subject of the invention consists of a sleeve *g* of rubber or like material surrounding or inclosing the housing *b*. The sleeve has a cylindrical inner surface corresponding to the cylindrical outer surface of the housing and supports the latter partly by frictional contact and partly in a direct manner. The device for compressing the sleeve radially so as to cause the same to grip the housing firmly yet yieldingly consists in the construction shown of a split steel ring *h* having a cylindrical inner surface and an upwardly tapering outer surface. The sleeve is inclosed in an outer casing *i* attached to the framework *j* and provided with a conical bore corresponding to the outer surface of the sleeve. By raising the sleeve in the casing by means of a screw nut *k* or in other suitable manner the required radial compression of the buffer may be obtained.

As may be seen from Figs. 3 and 4 the slits *m* in the ring *h* extend alternately from the bottom edge to a point near the upper edge and vice versa. The divided parts of the tapered sleeve allow the buffer to be equally compressed. In the construction shown the housing *b* is provided with an upper flange *n* resting upon the top surface of the buffer sleeve, while the buffer sleeve is supported from underneath by a ring *o* fixed by bolts *p* to the underside of the outer casing. Sufficient clearance must of course be provided between the flange *n* and the adjacent stationary part, in this case the split ring, on the one hand and between the inner edge of the supporting ring *o* and the housing on the other hand, so as to avoid direct contact of the maximum oscillation of the spindle.

If required the upper surface of the buffer sleeve and the under surface of the flange may be rounded so as to avoid entirely any vertical compression of the sleeve by the oscillatory movement of the spindle. In a similar manner the bearing surface of the buffer ring and the bottom surface of the buffer sleeve might be curved according to a circle described from the center of oscillation. It has however been found in practice that very satisfactory results are obtained with straight bearing surfaces. If it is desired to avoid the use of bearing surfaces, such as the flange *n* and the ring *o* for sustaining the load, the frictional contacts between the buffer and the housing and between the buffer and the compression ring may alone be used for supporting the load. In that case it may be advisable to form the outer surface of the housing and the inner surface of the compression ring with horizontal or vertical or horizontal and vertical grooves or with recesses in order to increase the friction. The surface supporting the buffer ring may be formed upon the compression ring instead of being fixed to the outer casing. The arrangement of the compression ring in the casing may be reversed, or other suitable means for compressing the buffer sleeve may be used.

It will be understood that the improved buffer may be applied directly to a stationary spindle carrying the running spindle instead of to the housing if it is not desired to place the combined thrust and running bearing within the buffer.

The main advantages of the improved buffer are the equality of pressure above and below the center of oscillation and the consequent stability of the center of oscillation, and the possibility of adjusting the damping action of the buffer in accordance with the particular circumstances.

I am aware that it has previously been proposed to use in a centrifugal machine an elastic buffer for the spindle or its collar composed of two or more rings separated by a loose distance piece or pieces, which rings coöperate with the spindle part along a cylindrical surface.

I claim:

1. A resilient bearing for centrifugal machines, having a shaft support, an outer casing having a longitudinally tapered opening, a longitudinally movable tapered sleeve mounted in the opening in the outer casing, said sleeve being split in a longitudinal direction, a rubber ring engaging the inner wall of the split sleeve and the outer wall of the shaft support, and means for adjusting the casing and sleeve relative to each other to compress the rubber ring directly in a radial direction against the shaft support; substantially as described.

2. A resilient bearing for centrifugal machines, having a shaft support provided with a concentric outer wall, an outer casing having a longitudinally tapered opening, a longitudinally movable tapered sleeve mounted in the opening in the outer casing, said sleeve being split longitudinally, a rubber ring having a concentric inner wall engaging the outer wall of the shaft support and the inner wall of the split sleeve, and a nut for adjusting the split sleeve in a longitudinal direction to compress the rubber ring directly in a radial direction throughout its extent against the shaft support; substantially as described.

3. A resilient bearing for centrifugal machines, having a shaft support, an outwardly extending flange on the upper end of the shaft support, an outer casing having a longitudinally extending tapered opening, a longitudinally movable tapered sleeve mounted in the opening in the outer casing, said sleeve being split longitudinally, a rubber ring engaging the inner wall of the split sleeve and the outer wall of the shaft support, a supporting ring connected to the outer casing, said rubber ring being seated between the ring on the outer casing and the flange on the shaft support, and an adjusting nut on the upper end of the split sleeve for moving said sleeve in a longitudinal direction to compress the rubber ring directly in a radial direction throughout its extent against the shaft support; substantially as described.

4. A resilient bearing for centrifugal machines, having a shaft support, an outer casing having a longitudinally tapered opening, a longitudinally movable tapered sleeve mounted in the opening in the outer casing, said tapered sleeve being split at a plurality of points from the top to a point near the bottom thereof and at a plurality of points from the bottom to a point near the top thereof, the splits extending from the top being in staggered relation to the splits extending from the bottom, an elongated rubber ring engaging the inner wall of the split sleeve and the outer wall of the shaft support, and means for moving the split sleeve in a longitudinal direction to compress the rubber ring throughout its length directly in a radial direction against the shaft support, the staggered slits in the sleeve being arranged to give an equal radial movement to the top and bottom of the sleeve; substantially as described.

In testimony whereof I have signed my name to this specification in the presence of two subscribing witnesses.

WILLIAM JOHN GEE.

Witnesses:
HOWARD C. WHITE,
I. J. WORTH.